United States Patent Office 3,669,562
Patented June 13, 1972

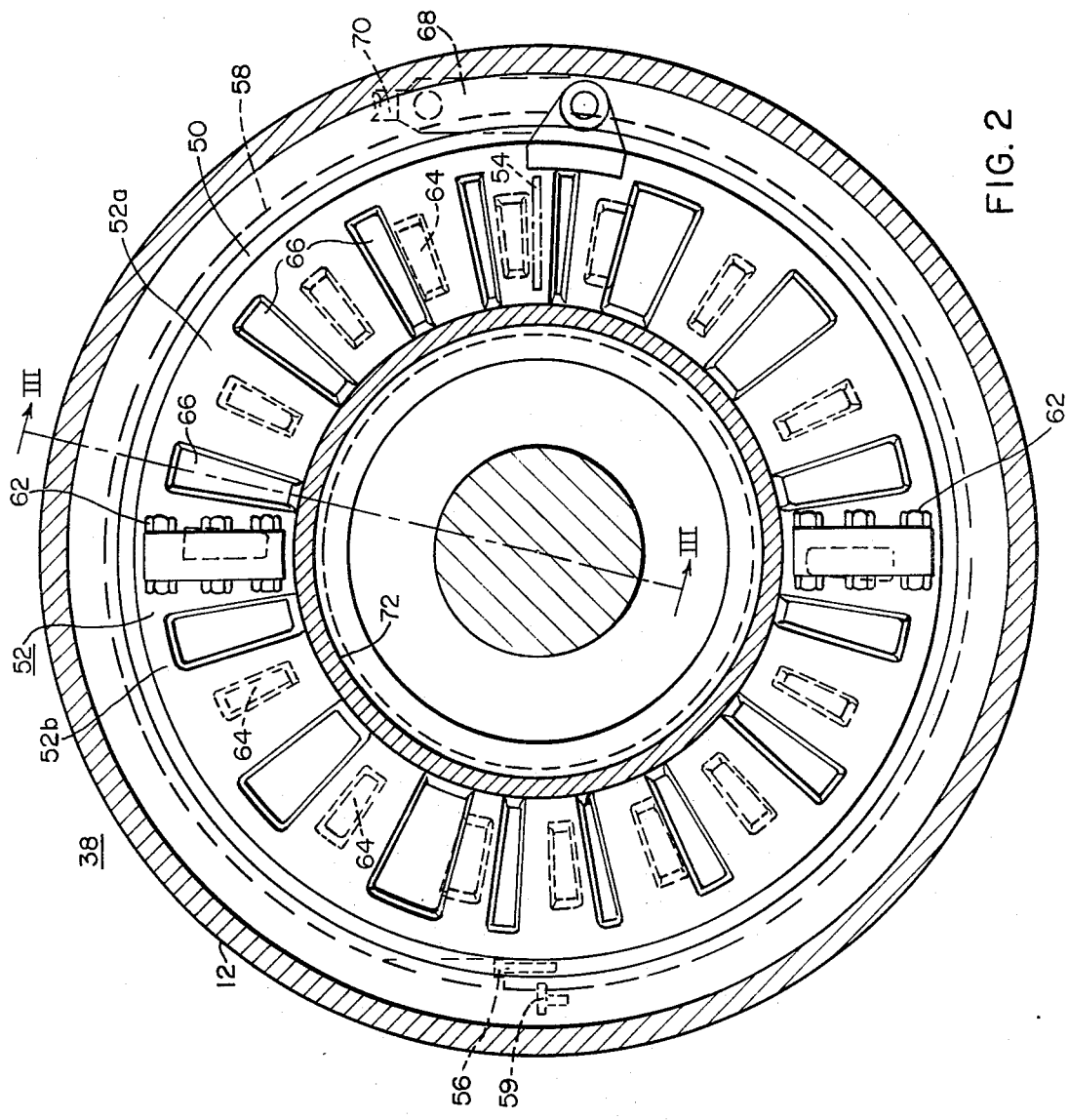

3,669,562
EXTRACTION TURBINE WITH A SERVO ACTUATED BALANCED GRID VALVE FOR EXTRACTION CONTROL
John M. McNally, Wallingford, and Albert H. Molette, Jr., Media, Pa., assignors to Westinghouse Electric Corporation, Pittsburgh, Pa.
Filed Jan. 12, 1971, Ser. No. 105,798
Int. Cl. F01d 9/00, 1/00, 17/00
U.S. Cl. 415—159
11 Claims

ABSTRACT OF THE DISCLOSURE

In an extraction turbine provided with a grid valve having a stationary port ring and a rotatable port ring actuated by a servomotor for controlling the flow of a highly pressurized elastic fluid, such as steam, pressure forces on the contacting interfaces of the two rings are minimized by providing an annular balancing member secured directly to the rotatable ring and acted upon by the high pressure elastic fluid in a manner to substantially balance the pressure forces on the rotatable ring, thereby enabling the grid valve to be utilized in higher pressure systems without increasing the effort required to operate the valve.

BACKGROUND OF THE INVENTION

This invention relates, generally, to extraction turbines having grid valves therein for controlling the flow of a pressurized fluid and, more particularly, to an automatic extraction steam turbine provided with a balanced grid valve suitable for use between different pressure stages of the steam turbine.

In a multi-stage turbine of the type having an extraction conduit connected to an intermediate stage for removing elastic fluid under an intermediate pressure, at least one of the stages has an interstage valve that cooperates with the inlet valve of the turbine to maintain substantially constant the pressure of the elastic fluid in the extraction conduit and the speed of the turbine irrespective of changes in the load on the turbine. Ordinarily, the extracted fluid, such as steam, is utilized as process steam, heating steam, and the like, and the turbine is utilized to drive a generator to produce electric power.

Heretofore, a multi-port grid valve of a rotatable type actuated by a servomotor has been utilized as an interstage valve for controlling the steam flow between a relatively high-pressure zone and a relatively low pressure zone of an extraction steam turbine. However, the application has been limited to a 75 p.s.i.g., 500° F. range because of the material used in the valve and excessive steam loading forces. The controlled steam pressure acting on the rotatable port ring of the valve creates a force on the two mating surfaces of the rotatable and the stationary port rings. This force is a function of the differential pressure across the valve and the exposed area. As these factors increase, the resulting force reaches a point where it is not practical to use the prior valve because of the enormous servomoter force required to actuate the rotatable port ring. The grid valve herein disclosed overcomes the undesirable limitations of relatively low pressure-temperature application by providing a force balancing member for the valve and utilizing more suitable materials in the valve components.

BRIEF SUMMARY OF THE INVENTION

In accordance with one embodiment of the invention, an extraction steam turbine is provided with a multi-port grid valve actuated by a servomotor and comprising a stationary port ring and a rotatable port ring having an annular balancing member encircling the turbine shaft and rotatable with the rotatable port ring. The balancing member cooperates with the valve to separate a relatively high pressure fluid zone from a relatively low pressure fluid zone in the steam turbine. The area of the balancing member is made such that the differential pressure across it creates a balancing force substantially equal to the force imposed on the rotatable port ring by the high pressure fluid. The low pressure zone is exhausted to a low pressure turbine stage downstream from the grid valve. Thus, the pressure acting on the low pressure side of the balancing member is that of the low pressure stage which depends on the flow through the section of the turbine which is controlled by the position of the rotatable port ring. The balancing member creates a compensating balancing effect, thereby maintaining a more constant and lower pressure on the grid valve contact faces than has been maintained previously, and reducing the force required to actuate the rotatable ring.

BRIEF DESCRIPTION OF THE DRAWING

For a better understanding of the nature of the invention, reference may be had to the following detailed description, taken in conjunction with the accompanying drawings, in which:

FIG. 2 is an enlarged view, partly in elevation and partly in transverse section, of the structure shown in FIG. 1, the grid valve being in the closed position; and FIG. 3 is a view, in section, taken along the line III—III in FIG. 2 when the grid valve is in the open position.

DESCRIPTION OF THE PREFERRED EMBODIMENT

Figure 1:
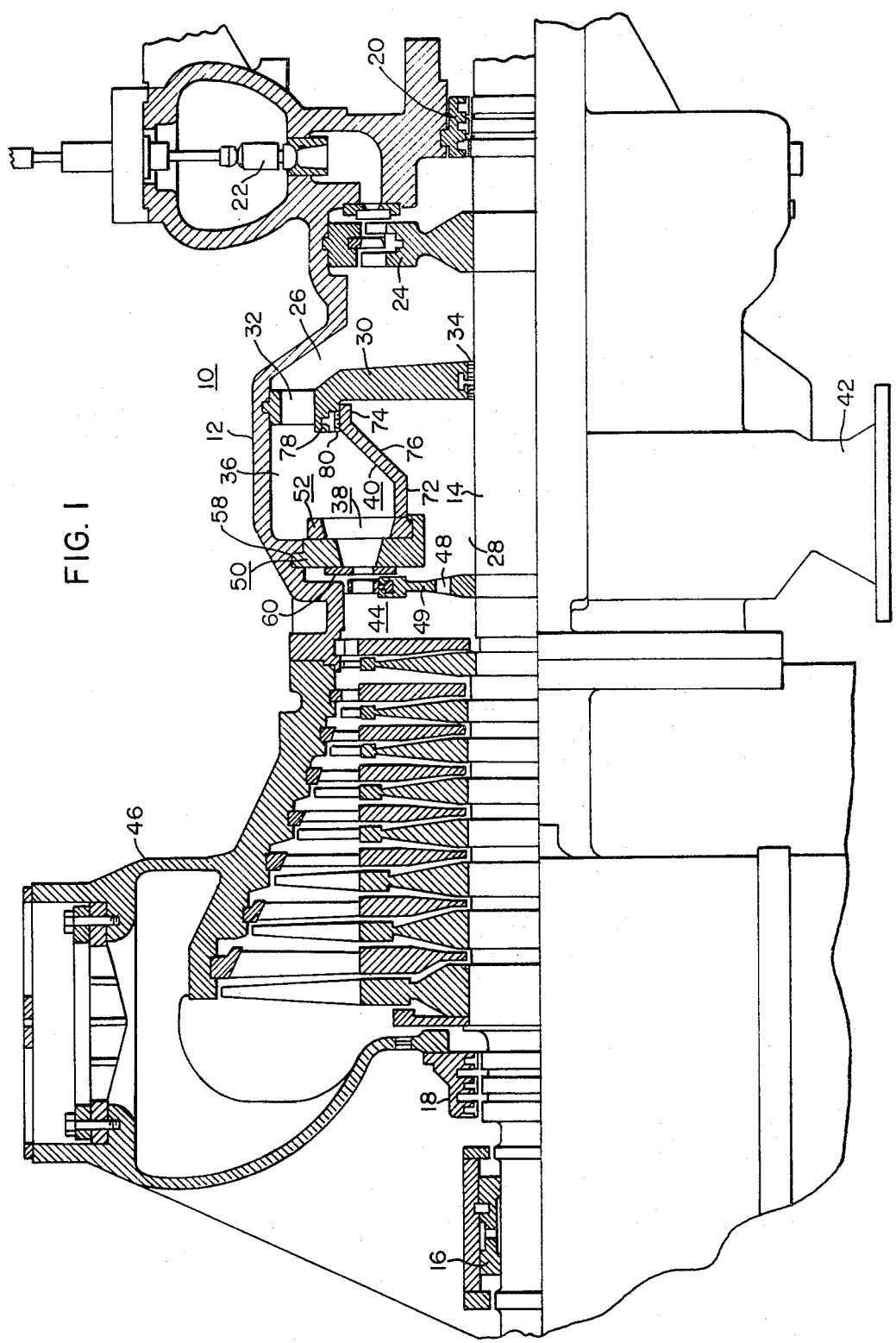
FIG. 1 is a view, partly in elevation and partly in longitudinal section, of a portion of an automatic extraction steam turbine provided with a balanced grid valve embodying principal features of the invention.

In FIG. 1 of the drawing there is shown a portion of a steam turbine 10 of the automatic extraction type. The turbine includes a casing 12 having a rotatable shaft 14 mounted therein on suitable bearings 16, only one of which is shown. Suitable seals 18 and 20, which may be of the labyrinth type, are provided around the shaft 14. High pressure steam is admitted into the casing 12 through an inlet valve 22 which may be of a type well known in the art.

The steam drives a rotor member 24 in a well known manner and then flows into a relatively high pressure zone 26 separated from a relatively low pressure zone 28 by a stationary baffle 30 which encircles the shaft 14 and is supported within the casing 12 by means of strut members 32. Thus, the baffle 30 cooperates with the casing to define the high and the low pressure zones. A seal 34, which may be of the labyrinth type, is provided between the annular baffle 30 and the shaft 14.

The steam flows from the high pressure zone 26 between the strut members 32 into an extraction pressure zone 36 separated from the low pressure zone 28 by means of an annular multi-port grid valve 38 and an annular balancing member 40 which encircle the shaft 14. A portion of the steam which is extracted from the turbine flows from the extraction zone 36 outwardly through an extraction conduit 42 which communicates with the extraction zone. The remainder of the steam flows from the extraction zone 36 through the grid valve 38 into low pressure stages 44 of the turbine. From the low pressure stages 44, the steam flows into an exhaust housing 46 from which it flows into a condenser (not shown). The low pressure zone 28 is interconnected with the low pressure stage area 44 through openings 48 provided in a rotor disc 49 of the first low pressure stage.

The function of the extraction valve 38, which is of the multi-port grid type, is to control the flow of steam toward the exhaust, thus maintaining in the extraction zone 36 on the high pressure side of the extraction valve 38 that pressure which is desired in the extraction system. As shown more clearly in FIGS. 2 and 3, the valve 38 comprises a stationary port ring 50 and a rotatable port ring 52. The ring 50 is split in the horizontal center plane into two parts 50a and 50b. The two halves are kept in accurate alignment by means of keys 54 which are secured in the lower half and engage keyways provided in the upper half. The two halves are also bolted together, and taper bolts 56 insure perfect alignment of the two halves.

The upper and lower halves 50a and 50b are fitted in grooves 58 machined in the casing cover and in the casing base. A small radial clearance is allowed between the port rings and the bottom of the groove to permit differential expansion between the ring and the casing. The stationary port ring 50, which is held in the casing by retaining screws 59 at the horizontal joint, constitutes a nozzle chamber to which the nozzle blocks 60 are bolted.

The rotatable port ring 52 is split along the vertical center plane into two halves 52a and 52b. The two halves are assembled on the stationary ring 50, being bolted together by bolts 62 and aligned in the same manner as the stationary ring. The ring 52 is free to rotate relative to the stationary ring 50.

As shown more clearly in FIG. 2, the stationary ring 50 contains a number of ports 64 of approximately the same size. In the present case, the stationary ring contains a total of 16 ports. The rotatable ring 52 contains the same number of ports 66, differing in size and so arranged that as the ring rotates counterclockwise, the ports open in sequence until all ports are fully opened. Each stationary ring port admits steam to a separate nozzle group and the successive opening of the ports, therefore, admits steam to the nozzles only as they are required to carry the load, thus maintaining a high efficiency. The rotatable port ring 52 is connected to a servomotor (not shown) through a connection link 68 and connecting rod 70 to actuate the ring between the "ports closed" and the "ports opened" positions.

As explained hereinbefore, the controlled steam pressure acting on the rotatable port ring 52 creates a force on the two mating surfaces of the rotatable and the stationary port rings. This force is a function of the differential pressure across the grid valve 38 and the exposed area. As these factors increase, the resulting force reaches a point where it is not practical to use a grid valve of a prior construction because of the enormous servomotor force required to actuate the rotatable port ring.

In order to overcome the foregoing limitations, the balancing member 40 is provided in the present structure. As shown more clearly in FIG. 1, the member 40 is generally annular in cross section and it may be formed integrally with the rotatable ring 52, or secured to the rotatable port ring 52, as by welding. The member 40 encircles the shaft 14 and comprises a first axially extending portion 72, and a second axially extending portion 74 which are joined by an angularly extending portion 76. The first portion 72 is secured to the rotatable port ring 52 and the second portion 74 is in rotatable relation with an axially extending flange 78 on the baffle 30 which is spaced axially from the grid valve 38. A labyrinth seal 80 is provided between the portion 74 and the flange 78, thereby enabling the baffle to function as a guide for the balancing member. Thus, the balancing member 40 cooperates with the baffle 30 and the grid valve 38 to separate the relatively high pressure zones 26 and 36 from the relatively low pressure zone 28 within the turbine casing 12.

In order to counteract the force acting on the rotatable port ring 52, the area of the balancing member 40 is made such that the differential pressure across it creates a balancing force substantially equal to the force imposed on the rotatable port ring. As explained hereinbefore, conventional turbine steam seals are used to separate the two pressure zones defined by the balancing member. The low pressure zone is exhausted through the low pressure turbine stages 44 downstream from the grid valve. The pressure acting on the underneath side of the balancing member 40 is that of the low pressure stage. The pressure in the low pressure stage depends on the flow through the section of the turbine which is controlled by the position of the rotatable port ring 52. The wider open the ports become, the higher the pressure in the low pressure zone becomes. This lessens the force on the valve. The balancing force also becomes less because of the increasing zone pressure, while the pressure ahead of the grid valve is held constant. Thus, this tends to keep the load on the grid valve constant and small. However, sufficient pressure is maintained on the grid valve to keep the interfaces of the rotatable and the stationary port rings in contacting relation.

The balancing structure herein described creates a compensating balancing effect and therefore maintains a more constant and overall lower pressure on the grid valve contact faces than has been obtained in prior grid valve structures. Therefore, less servomotor force is required to actuate the valve.

A further improvement is realized because the materials preferably used for the grid valve components have a relatively low coefficient of friction. In addition, the materials have been selected on the basis of other favorable features as follows:

(1) Excellent resistance to wear—when metal surfaces are rubbed together without lubrication.

(2) Resistant to general abrasions and galling.

(3) Excellent corrosion, erosion and oxidation resistance.

(4) These metals derive their excellent wear characteristics, not from their aggregate hardness, but rather from the following:

(a) Surfaces readily work harden when rubbed together under pressure.

(b) Hard wear resistant particles, appropriately held within a suitable work hardened matrix.

(c) Natural lubrication afforded by excess carbon in the form of graphite.

The preferred material for the stationary component is essentially a ferrous base alloy containing 3.0C-14Ni-2Cr-6Cu, known as AMS 5392 and commercially available. The material has a tensile strength of 25–30 k.s.i.; a compressive yield strength of 100–120 k.s.i.; and the hardness is only 130–170 BHN.

The prefered material for the rotatable component is essentially a ferrous base alloy containing 3.0C-20Ni-2Cr, known as AMS 5394 or ASTM A439–62 and commercially available. This material has a tensile strength of 58–60 k.s.i.; a compressive yield strength of 180–200 k.s.i. and the hardness is only 140–200 BHN.

Both of the materials should be suitably heat treated after casting to optimize machinability and high temperature dimensional stability. The construction must allow for the high thermal coefficient of both materials which is approximately $10.5 \times 10^{-6}/°F$.

The surfaces of both grid valve components should be suitably coated with a lubricant such as molybdenum disulfide before operating initially. This will allow contact faces to wear in more compatibly, removing surface irregularity and minimizing effects of any other undesirable conditions, until surfaces work harden.

The materials may be suitably cast to the desired geometry and properly tooled and ground to a smooth finish on the contact faces. After machining, no surface hardening or other treatment is required to enhance the properties of wear resistance.

From the foregoing description, it is apparent that the invention provides an extraction turbine with a balanced grid valve structure which is suitable for use in high pressure and high temperature regions in extraction turbines where previously it has been necessary to resort to a costly multi-valve secondary steam chest. The present valve can be utilized for controlling steam flow where the temperature does not exceed 900° F. Thus, a considerable cost reduction can be realized by utilizing the valve structure herein described.

We claim as our invention:

1. In an extraction steam turbine having a rotatable shaft, in combination,
    a casing having a relatively high pressure fluid zone and a relatively low pressure fluid zone therein,
    an extraction conduit communicating with the high pressure zone to extract steam from said high pressure zone,
    a multi-port grid valve comprising a stationary port ring and a rotatable port ring in contacting relation for controlling the flow of steam from the high pressure zone into the low pressure zone,
    means for actuating the rotatable port ring relative to the stationary port ring,
    an annular balancing member cooperating with the valve to separate the high pressure fluid zone from the low pressure fluid zone, and
    the area of the balancing member being such that the differential pressure across it creates a balancing force substantially equal to the force imposed on the rotatable port ring by the high pressure fluid to reduce the force required to actuate the rotatable ring.

2. The combination defined in claim 1, wherein the balancing member is secured to and is rotatable with the rotatable port ring.

3. The combination defined in claim 1, wherein the grid valve and the balancing member encircle the shaft.

4. The combination defined in claim 3, including an annular baffle encircling the shaft and cooperating with the casing to define the high and the low pressure zones.

5. The combination defined in claim 4, wherein the baffle is spaced axially from the grid valve, and the balancing member extends between the grid valve and the baffle.

6. The combination defined in claim 5, wherein the baffle is stationary and functions as a guide for the rotatable balancing member.

7. The combination defined in claim 6, wherein the balancing member includes a first axially extending portion and a second axially extending portion joined by an angularly extending portion.

8. The combination defined in claim 7, wherein the first axially extending portion is secured to the rotatable port ring and the second axially extending portion is in rotatable relation with the baffle.

9. The combination defined in claim 1, wherein the stationary port ring and the rotatable port ring have contacting interfaces composed of materials having a relatively low coefficient of friction.

10. The combination defined in claim 1, wherein the grid valve is composed of materials capable of withstanding a relatively high temperature.

11. In a multi-stage axial flow extraction steam turbine having a rotatable shaft, in combination,
    a casing having high pressure and low pressure stages therein with an extraction pressure zone between said stages,
    an extraction conduit communicating with the extraction pressure zone to extract steam from said extraction pressure zone,
    a multi-port grid valve comprising a stationary port ring and a rotatable port ring in mutually contacting relation for controlling the flow of steam from the extraction pressure zone into the low pressure stages, said grid valve encircling the shaft,
    means for actuating the rotatable port ring relative to the stationary port ring,
    an annular balancing member encircling the shaft and cooperating with the valve to separate the extraction pressure zone from the low pressure stages,
    said balancing member being secured to and rotatable with the rotatable port ring, and
    the area of the balancing member being such that the differential pressure across it creates a balancing force substantially equal to the force imposed on the rotatable port ring by steam in the extraction pressure zone to reduce the force required to actuate the rotatable ring.

References Cited

UNITED STATES PATENTS

| | | | |
|---|---|---|---|
| 779,949 | 1/1905 | MacDonald | 415—159 |
| 864,199 | 8/1907 | Schulz | 415—159 |
| 867,611 | 10/1907 | Schulz | 415—149 |
| 1,544,285 | 6/1925 | Trotter | 415—159 |
| 2,666,618 | 1/1954 | Jaquith | 415—159 |
| 3,066,488 | 12/1962 | Mock | 415—159 |

HENRY F. RADUAZO, Primary Examiner

U.S. Cl. X.R.

415—104 disclosure